United States Patent
Humphries (10) Patent No.: US 8,301,751 B2
(45) Date of Patent: Oct. 30, 2012

(54) GENERATION OF A MASTER SCHEDULE FOR A RESOURCE FROM A PLURALITY OF USER CREATED SCHEDULES FOR THE RESOURCE

(75) Inventor: Marshall Lee Humphries, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 11/173,586

(22) Filed: Jun. 30, 2005

(65) Prior Publication Data

US 2007/0005755 A1    Jan. 4, 2007

(51) Int. Cl.
G06F 15/173    (2006.01)

(52) U.S. Cl. .......................... 709/224; 709/226

(58) Field of Classification Search .................. 709/223, 709/224, 225, 226; 718/102
See application file for complete search history.

(56) References Cited

U.S. PATENT DOCUMENTS

| | | | |
|---|---|---|---|
| 5,237,518 A | 8/1993 | Sztipanovits et al. | |
| 5,442,730 A | 8/1995 | Bigus | |
| 5,497,486 A * | 3/1996 | Stolfo et al. | 707/7 |
| 5,751,963 A * | 5/1998 | Umetsu | 709/223 |
| 5,856,931 A | 1/1999 | McCasland | |
| 5,890,134 A | 3/1999 | Fox | |
| 6,023,507 A * | 2/2000 | Wookey | 709/224 |
| 6,310,692 B1 * | 10/2001 | Fan et al. | 358/1.14 |
| 6,421,737 B1 * | 7/2002 | Stone et al. | 719/318 |
| 6,502,062 B1 | 12/2002 | Acharya et al. | |
| 6,513,060 B1 * | 1/2003 | Nixon et al. | 709/203 |
| 6,859,839 B1 * | 2/2005 | Zahorjan et al. | 709/231 |
| 2002/0026342 A1 | 2/2002 | Lane et al. | |
| 2003/0001737 A1 | 1/2003 | Shiratori et al. | |
| 2003/0007466 A1 | 1/2003 | Chen | |
| 2003/0182420 A1 * | 9/2003 | Jones et al. | 709/224 |
| 2004/0002884 A1 * | 1/2004 | Lenio | 705/8 |
| 2004/0193656 A1 | 9/2004 | Pizzo et al. | |
| 2004/0221184 A1 | 11/2004 | Hellerstein et al. | |
| 2004/0249935 A1 * | 12/2004 | Jackson et al. | 709/224 |
| 2005/0021504 A1 * | 1/2005 | Atchison | 707/3 |
| 2009/0320025 A1 * | 12/2009 | Ferguson et al. | 718/100 |

FOREIGN PATENT DOCUMENTS

| | | |
|---|---|---|
| CN | 1514358 | 7/2004 |
| CN | 1534520 | 10/2004 |
| GB | 2 388 214 A | 11/2003 |
| JP | 9270794 | 10/1997 |
| JP | 11175539 | 2/1999 |

(Continued)

OTHER PUBLICATIONS

PCT International Search Report and Written Opinion mailed Sep. 20, 2006 for Application No. PCT/EP2006/063404 filed Jun. 21, 2006.

(Continued)

Primary Examiner — Larry Donaghue
Assistant Examiner — Steven Nguyen
(74) Attorney, Agent, or Firm — Rabindranath Dutta; Konrad, Raynes, Davda & Victor LLP (57) ABSTRACT

A plurality of user defined schedules are received for collecting data on a plurality of resources. A schedule is generated for data collection on at least one resource, based on processing the plurality of user defined schedules to eliminate redundant data collection on the at least one resource. Operations are executed on the at least one resource in accordance with the generated schedule.

20 Claims, 6 Drawing Sheets

FOREIGN PATENT DOCUMENTS

| | | |
|---|---|---|
| JP | 200259520 | 9/2000 |
| WO | 2007003509 | 11/2007 |

OTHER PUBLICATIONS

Patent Abstract for CN1534520A, Published on Oct. 6, 2004, 1pg.
Patent Abstract for CN1514358A, Published on Jul. 21, 2004, 1pg.
Letter from China IP Law regarding Information Disclosure Statement for U.S. Appl. No. 11/173,586, dated Nov. 14, 2008, 1 pp.
Response to Office Action, dated Aug. 26, 2009, for Application No. EP 06763816.3-1225, 5 pp.
Information Materials for IDS, dated Nov. 18, 2011, pp. 1-2.
Japanese Office Action, dated Nov. 1, 2011, pp. 1-3.
Machine Translation for JP11175539, Published Feb. 7, 1999, 11 pp.
Machine Translation for JP200259520, Published Sep. 22, 2000, 11 pgs.

* cited by examiner

GENERATION OF A MASTER SCHEDULE FOR A RESOURCE FROM A PLURALITY OF USER CREATED SCHEDULES FOR THE RESOURCE

BACKGROUND

1. Field

The disclosure relates to a method, system, and article of manufacture for managing schedules for monitored resources.

2. Background

A group of resources, such as, printers, scanners, workstations, etc., may be managed by one or more management applications in a computational environment. Management applications may collect data about resources, such as, printers, scanners, workstations, etc., that are managed by the management applications. In certain situations, the data about resources may be collected continuously in real time, but in many situations the continuous collection of data about resources may not be practical. As a result, end-users may create a plurality of schedules for collecting data about a plurality of resources, and the plurality of resources may be executed by a scheduler application to collect data.

If a plurality of software applications monitor the same resource, then a plurality of schedules for collecting data from the same resource may potentially be created. If a plurality of schedules attempt to use the same resource at the same time there may be conflicts and certain schedules may be unable to run or may collect incorrect data.

Users may find it difficult to determine that different schedules may be in conflict or that necessary data is not being collected frequently enough to meet the needs of the users. In certain situations, data collection may impact the performance of computing environments by utilizing resources that may be used for other operations. Inefficient scheduling may lead to data collection occurring more often than required on certain resources, and may also lead to data collection occurring less frequently than needed on others. If data collections occur more frequently than required, then computing time is wasted. Also, if data collections occur less frequently than required then the data collected may be stale and may not help the software or the user to make informed management decisions.

SUMMARY OF THE DESCRIBED EMBODIMENTS

Provided are a method, system, article of manufacture, and a computer readable medium, wherein a plurality of user defined schedules are received for collecting data on a plurality of resources. A schedule is generated for data collection on at least one resource, based on processing the plurality of user defined schedules to eliminate redundant data collection on the at least one resource. Operations are executed on the at least one resource in accordance with the generated schedule.

In additional embodiments, the user defined schedules provide indications on selected resources to be monitored for collecting the data, a frequency for collecting the data, and properties of the data to be collected.

In yet additional embodiments, the operations on the at least one resource in accordance with the generated schedule are first operations, wherein the executing of the first operations in accordance with the generated schedule consume less processing time in comparison to execution of second operations that monitor the at least one resource based directly on the user defined schedules.

In further embodiments, the plurality of resources may be included in a plurality of groups, and wherein the user defined schedules indicate collection of data on the plurality of groups. A determination is made as to whether the user defined schedules indicating the collection of data on the plurality of groups cause conflicts in collecting the data on the plurality of resources. The conflicts are eliminated in the generated schedule.

In yet further embodiments, collections of similar but not identical requests in the user defined schedules are grouped. A collection of the similar requests are combined into a single entity in the generated schedule.

In certain further embodiments, an indication is received that a user defined schedule has been modified. The schedule is rebuilt based on the modified user defined schedule and other unmodified user defined schedules.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

If data collection schedules are created independently of resources (or groups of resources) then a plurality of schedules may be created to monitor or determine data about the same resource and conflicts may occur. In certain embodiments schedules are associated with groups that the schedules collect data for, and a master schedule is created to determine when to actually run data collection for each resource being monitored. The master schedule may reduce or eliminate conflicts and duplications.

Figure 1:
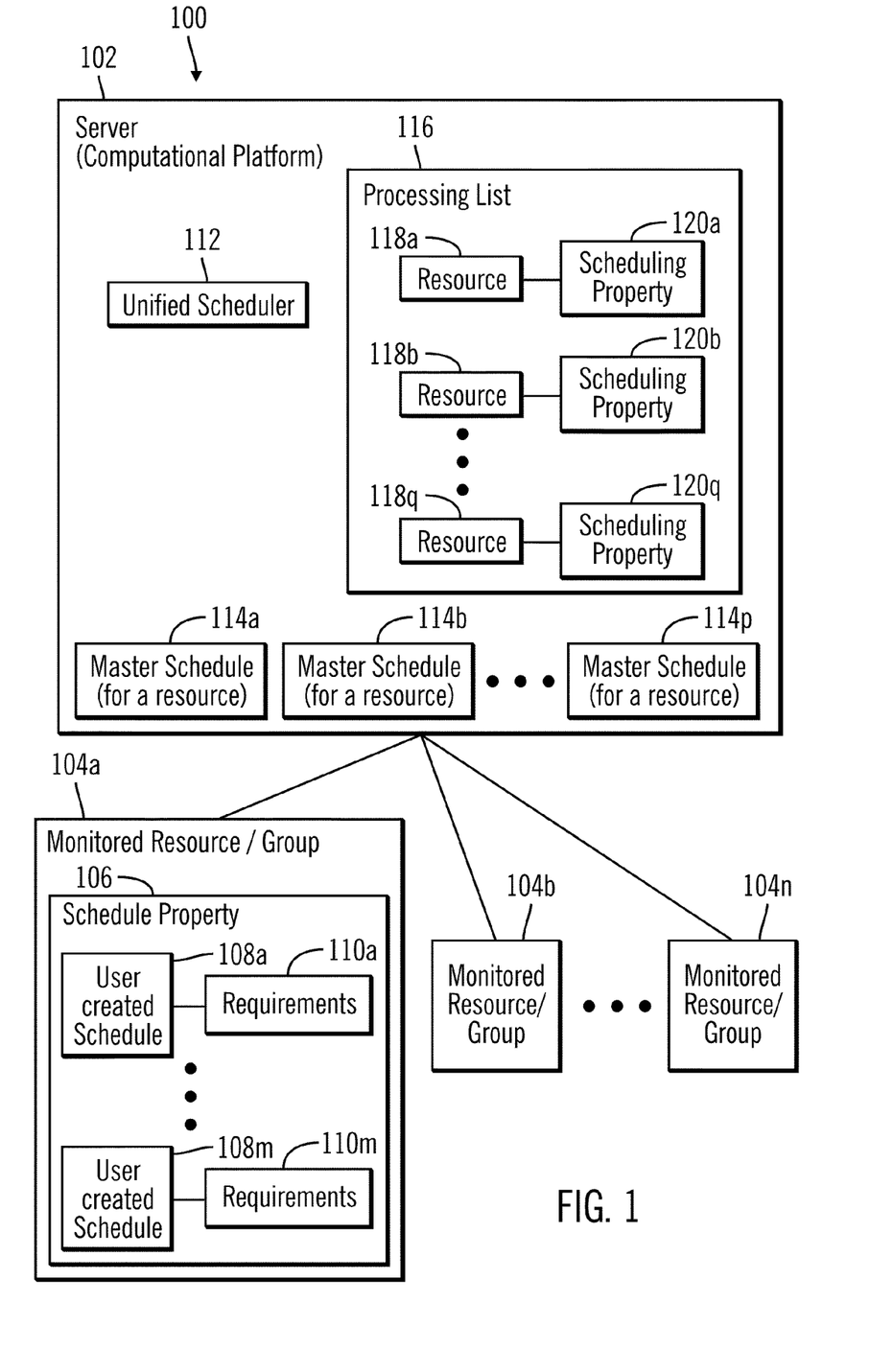
FIG. 1 illustrates a block diagram of a computing environment in accordance with certain embodiments.

FIG. 1 illustrates a block diagram of a computing environment 100 in accordance with certain embodiments.

At least one computational platform 102, where in certain embodiments the computational platform 102 may comprise a server, is coupled to one or more resources 104a, 104b, . . . , 104n. While FIG. 1 indicates the computational platform 102 to be a server, in alternative embodiments the computational platform 102 may comprise any suitable computational platform, including those presently known in the art, such as, personal computers, workstations, mainframes, midrange computers, network appliances, palm top computers, telephony devices, blade computers, hand held computers, etc. The resources 104a . . . 104n may comprise any suitable resource, including those presently known in the art, such as, printers, scanners, fax machines, disk drives, storage devices, peripheral devices, computing devices, routers, etc. The resources 104a . . . 104n are not limited to hardware resources and may also comprise software resources such as lists, queues, stacks, databases, and other data structures in computing devices. The coupling of the server 102 to the resources 104a . . . 104n may be direct or may be via any network known in the art, such as a Storage Area Network (SAN), Local Area Network (LAN), Wide Area Network (WAN), the Internet, an Intranet, etc. In certain embodiments a monitored resource, such as the monitored resource 104a, may represent a group of resources rather than a single resource.

Various processes and tasks may perform data collection operations on the resources 104a . . . 104n. In exemplary embodiments, the processes and tasks that perform data collection operations on the resources may be scheduled to run at certain times or at certain intervals. For example, in certain embodiments in which the monitored resource 104a is a printer, a task may be scheduled at 3 PM to collect data on the number of pages printed in the last hour on the resource 104a.

The plurality of resources 104a . . . 104n are managed or monitored by the server 102, and in certain embodiments the plurality of resources 104a . . . 104n may be referred to as monitored resources 104a . . . 104n. A schedule property, such as exemplary schedule property 106 may be associated with a monitored resource, such as the monitored resource 104a. Other schedule properties may be associated with other monitored resources. A schedule property, such as the schedule property 106, may include one or more user created schedules 108a . . . 108m and corresponding requirements 110a . . . 110m. For example an exemplary user created schedule may have a requirement that data collection be performed on a resource four times a day.

The server 102 may include applications and/or data structures corresponding to a unified scheduler 112, a plurality of master schedules 114a, 114b, . . . , 114p, and a processing list 116. The unified scheduler 112 processes a plurality of user created schedules for a plurality of monitored resources 104a . . . 104n and schedules operations on the monitored resources 104a . . . 104n. The master schedules 114a . . . 114p each correspond to a schedule for a monitored resource that has been generated by the unified scheduler 112 from the user created schedules by eliminating conflicts and redundancies. For example, master schedule 114a may include schedules for a first resource, and master schedule 114b may include schedules for a second resource.

The processing list 116 is a data structure that includes a plurality of resources 118a, 118b, . . . 118q and corresponding scheduling properties 120a, 120b, . . . 120q, where the resources 118a . . . 118q may be selected from the monitored resources 104a . . . 104n. The processing list 116 is used by the unified scheduler 112 to generated the master schedules 114a . . . 114p from the user created schedules.

In certain embodiments illustrated in FIG. 1, the unified scheduler 112 processes the user created schedules for the resources 104a . . . 104n, where the user created schedules may have conflicts or unnecessary repetition of operations on the resources 104a . . . 104n. In certain embodiments, the unified scheduler 112 reduces or eliminates the conflicts and unnecessary repetition of operations on the resources while scheduling operations on the resources 104a . . . 104n, i.e., the unified scheduler 112 schedules operations on the monitored resources 104a . . . 104n by eliminating repetitions and redundancies in the user created schedules.

Figure 2:
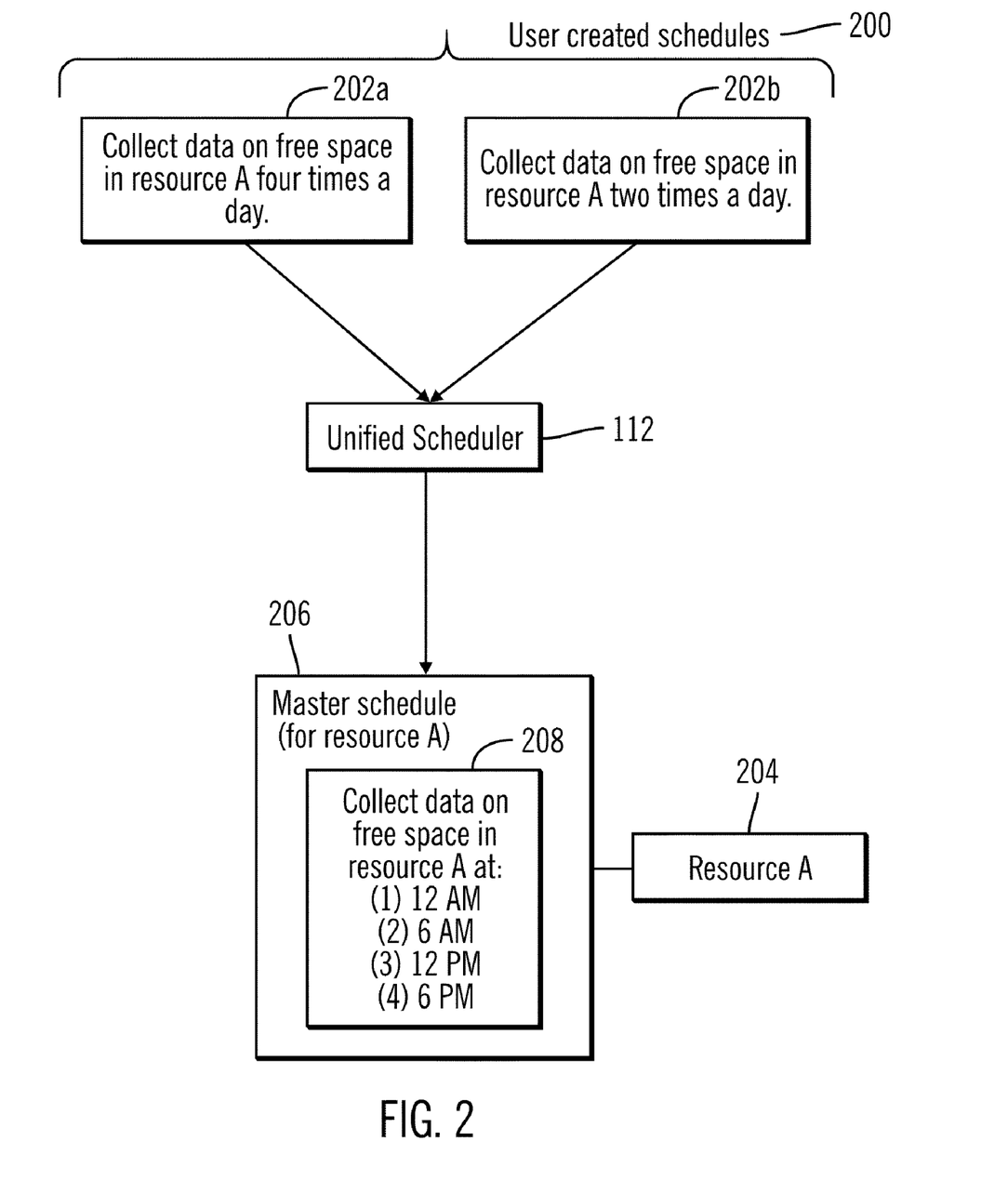
FIG. 2 illustrates a block diagram that shows how a master schedule for a resource is generated from a plurality of user defined schedules, in accordance with certain embodiments.

FIG. 2 illustrates a block diagram that shows data structures implemented in the computing environment 100, in accordance with certain embodiments.

In an exemplary embodiment, user created schedules 200 may include exemplary requirements 202a, 202b, where exemplary requirement 202a requests collection of data on free space in resource A 204 four times a day, and exemplary requirement 202b requests collection of data on free space in resource A 204 twice a day. For example, two different user may have generated the user created schedules 200, or a single user may have for two different tasks generated the user created schedules 200.

The unified scheduler 112 processes the requirements 202a, 202b of the exemplary user created schedules 200, and generates a master schedule 206 for resource A 204. An exemplary master schedule 206 may include an indication 208 to collect data on fee space in resource A at 12 AM, 6 AM, 12 PM, and 6 PM. The indication 208 in the master schedule 106 satisfies the exemplary requirement 202a of collecting data four times a day, and also satisfies the exemplary requirement 202b of collecting data two times a day.

Certain embodiments illustrated in FIG. 2 allow users to create schedules that reduce or eliminates overlaps and conflicts. The unified scheduler 112 generates a master schedule for a resource based on the user created schedules. The master schedule generated by the unified scheduler may reduce or eliminate overlaps and conflicts and may also satisfy the requirements of the user created schedules.

Figure 3:
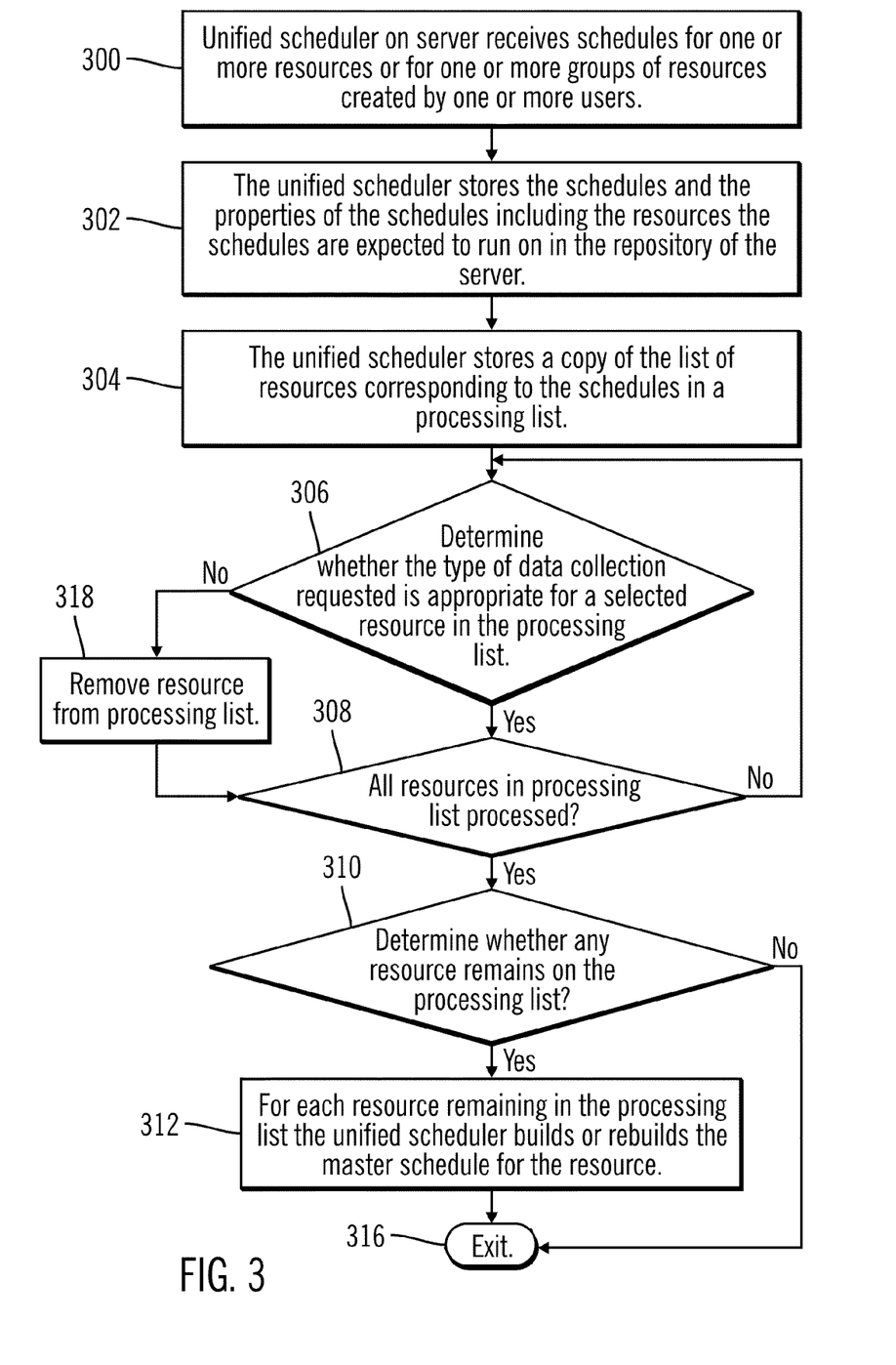
FIG. 3 illustrates a first flowchart that shows how a data collection schedule is created, in accordance with certain embodiments.

FIG. 3 illustrates a first flowchart that shows how a data collection schedule is created, in accordance with certain embodiments. The operations illustrated in the flowchart of FIG. 3 may be implemented in the unified scheduler 112 or in any other application that executes on the server 102. The data collection schedule created by the unified scheduler 112 may correspond to the master schedules 114a . . . 114p.

Control starts at block 300, where the unified scheduler 112 on the server 102 receives schedules for one or more resources 104a . . . 104n or for one or more groups of resources created by one or more users. For example, in certain embodiments the schedules received by the unified scheduler 112 in block 300 may include the user created schedules 108a . . . 108n.

The unified scheduler 112 stores (at block 302) the schedules and the properties of the schedules including the resources the schedules are expected to run on, in a repository of the server 102. For example, in certain embodiments, the schedules may run on the managed resources 104a . . . 104n. Additionally, the unified scheduler 112 stores (at block 304) a copy of the list of resources corresponding to the schedules in the processing list 116.

Control proceeds to block 306, where the unified scheduler 112 determines whether the type of data collection or operation requested is appropriate for a selected resource in the processing list. For example, if the number of pages printed in the last hour are requested for a printer then the request may be determined to be appropriate, whereas if the number of pages printed in the last hour are requested for a scanner then the request may be determined to be inappropriate if the scanner does not support printing. If at block 306, a determination is made that the type of data collection requested is appropriate, then control proceeds to block 306 where a determination is made as to whether all resources in the processing list 116 have been processed. If not, control returns to block 306, for determining whether the type of data collection requested is appropriate for a next selected resource of the processing list 116.

If at block 306, the unified scheduler 112 determines that the type of data collection requested is inappropriate for a selected resource, then the selected resource is removed from the processing list 116. For example, in certain embodiments the resource 118b may be removed from the processing list 116.

If at block 308 a determination is made that all resources, such as resources 118a . . . 118n, in the processing list 208, have been processed then the unified scheduler 112 determines (at block 310) whether any resource remains on the processing list 116. The resources remaining on the processing list have appropriate data collection requests associated with the resources.

If the unified scheduler 112 determines (at block 310) that a resource remains on the processing list 116, then for each resource remaining in the processing list 116 the unified scheduler 112 builds or rebuilds (at block 312) the master schedule for the resource. For example, the unified scheduler 112 may build or rebuild the master schedule 114a for a resource, such as resource 104a. Once the master schedules have been built for all the resources remaining the processing list 116, the unified scheduler 112 exits (at block 316) the process of creating the master schedules.

If at block 310, the unified scheduler 112 determines that no resource remains on the processing list then the unified scheduler 112 exits (at block 312) the process of creating the master schedules.

Certain embodiments illustrated in FIG. 3 show the creation of master schedules 114a . . . 114p corresponding to monitored resources 104a . . . 104n by the unified scheduler 112. The master schedule, such as master schedule 114a, for a resource may be created based on user created schedules 108a . . . 108m. In certain embodiments, errors, duplications, redundancies, etc., may be removed while the master schedule for a resource is being generated by the unified scheduler 112.

Figure 4:
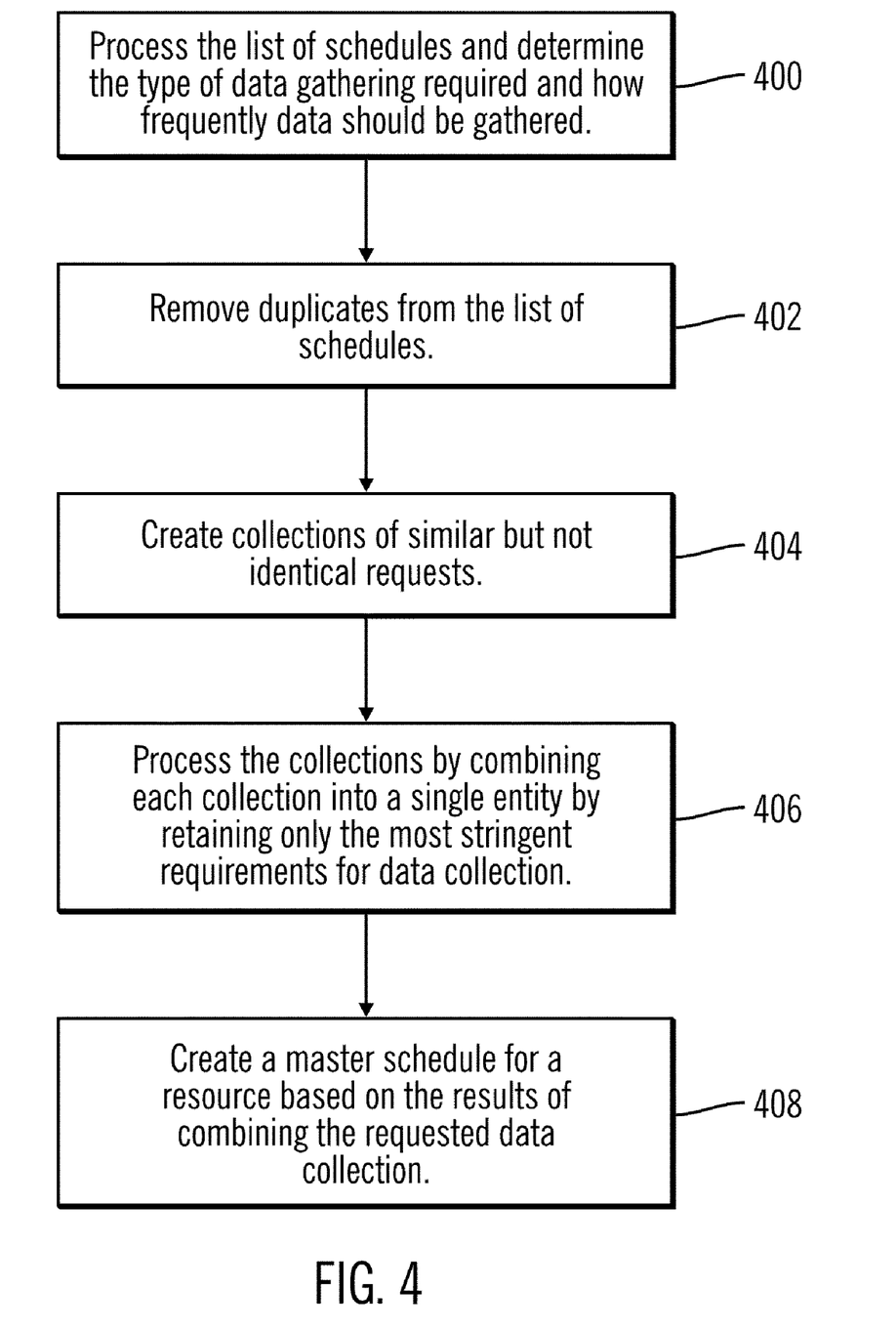
FIG. 4 illustrates a second flowchart that shows how a master schedule is built, in accordance with certain embodiments.

FIG. 4 illustrates a second flowchart that illustrates operations for creating master schedules, in accordance with certain embodiments. The operations illustrated in the flowchart of FIG. 4 may be implemented in the unified scheduler 112 or in any other application that executes on the server 102.

Control starts at block 400, where the unified scheduler 112 processes a list of schedules, such as user created schedules 108a . . . 108m, to determine the type of data gathering required and the frequency of data gathering. For example, in certain embodiments the data gathering required may include exemplary ping, scan, or scan with custom profile operations. Other embodiments may include other types of data gathering operations.

The unified scheduler 112 removes (at block 402) duplicates from the list of schedules. For example, if two schedules both request data collection on resource B four times a day, then instead of collecting data on resource B eight times a day, the two schedules may be merged to remove duplicates and data may be collected on resource B four times a day.

In certain embodiments, the unified scheduler 112 may create (at block 404) collections of similar but not identical requests. For example, a first scan request that is a default scan request to be performed twice a day with any profile, may be grouped in the same collection with a second scan request that is a scan request with a certain specific profile.

Control proceeds to block 406, where the unified scheduler 112 processes the collections by combining each collection into a single entity by retaining only the most stringent requirements for data collection. For example, the first scan request and the second scan request may be combined to into one scan request that runs twice a day with the specific profile.

In certain alternative embodiments, user specified capacity thresholds for processing of schedules and resources may also be included.

The unified scheduler 112 creates (at block 408) a master schedule for a resource based on the results of combining the requested data collection requested by users.

Subsequent to the creation of the master schedule, when the unified scheduler 112 builds the list of schedules to run, the unified scheduler 112 builds the schedules from the master schedules 114a . . . 114p rather than from the individual schedules 108a . . . 108m that were created by end users. Certain embodiments allow the end users to specify what type of data gathering is needed based on groups of resources, and allows a management software including the unified scheduler 112 on the server 102 to gather the data without redundant monitoring of the resources 104a . . . 104n.

Should a user decide at a later time to delete a schedule property, such as schedule property 106, from a group, then a request is sent to the server 102 to delete the schedule. The unified scheduler 112 removes the affected schedule from the schedule property of each resource against which the schedule was supposed to run. The unified scheduler 112 rebuilds the master schedule for each resource affected by the removal of the affected schedule.

Figure 5:
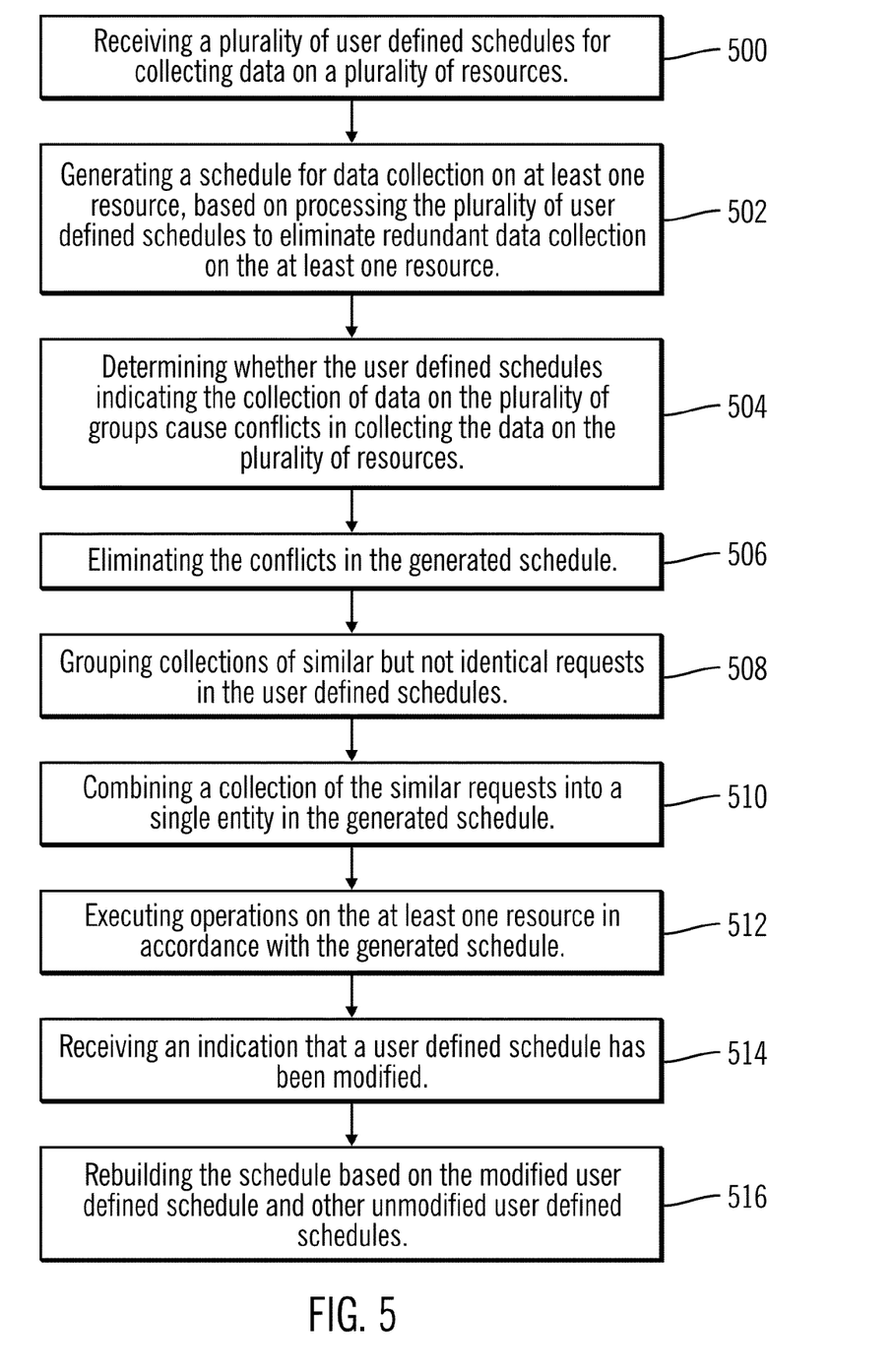
FIG. 5 illustrates a third flowchart that shows how schedules are managed for monitored resources, in accordance with certain embodiments.

FIG. 5 illustrates a third flowchart that illustrates how schedules are managed for monitored resources, in accordance with certain embodiments. The operations illustrated in the flowchart of FIG. 5 may be implemented in the unified scheduler 112 or in any other application that executes on the server 102.

Control starts at block 500, where the unified scheduler 112 receives a plurality of user defined schedules for collecting data on a plurality of resources. The unified scheduler 112 generates (at block 502) a schedule for data collection on at least one resource, based on processing the plurality of user defined schedules to eliminate redundant data collection on the at least one resource.

Control proceeds to block 504, where the unified scheduler 112 determines whether the user defined schedules indicating the collection of data on the plurality of groups cause conflicts in collecting the data on the plurality of resources. The unified scheduler 112 eliminates (at block 506) the conflicts in the generated schedule.

The unified scheduler 112 groups (at block 508) collections of similar but not identical requests in the user defined schedules. Additionally, the unified scheduler 112 may combine (at block 510) a collection of the similar requests into a single entity in the generated schedule.

Control proceeds to block 512, where the unified scheduler 112 executes operations on the at least one resource in accordance with the generated schedule. On receiving (at block 514) an indication that a user defined schedule has been modified, the unified scheduler rebuilds (at block 516) the schedule based on the modified user defined schedule and other unmodified user defined schedules.

Certain embodiments allow the collection of data across a plurality of groups of resources and potentially across a plurality of software products. It is ensured that data collection is handled without unnecessary repetitions and without conflicts. End-users avoid creating individual resource schedules and may specify what kind of data is needed by the end-users at the group level at which a plurality of resources may be grouped. Such groups may include heterogeneous resources or may include other groups. The usability for users may be improved.

Certain embodiments reduce wasteful use of computational resources in collecting data, and is effective in collecting data more reliably. Certain embodiments also allow complex groups of resources to be created one and then reused. There is no need to have one type of group for data collection and another for actions against the data.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 6:
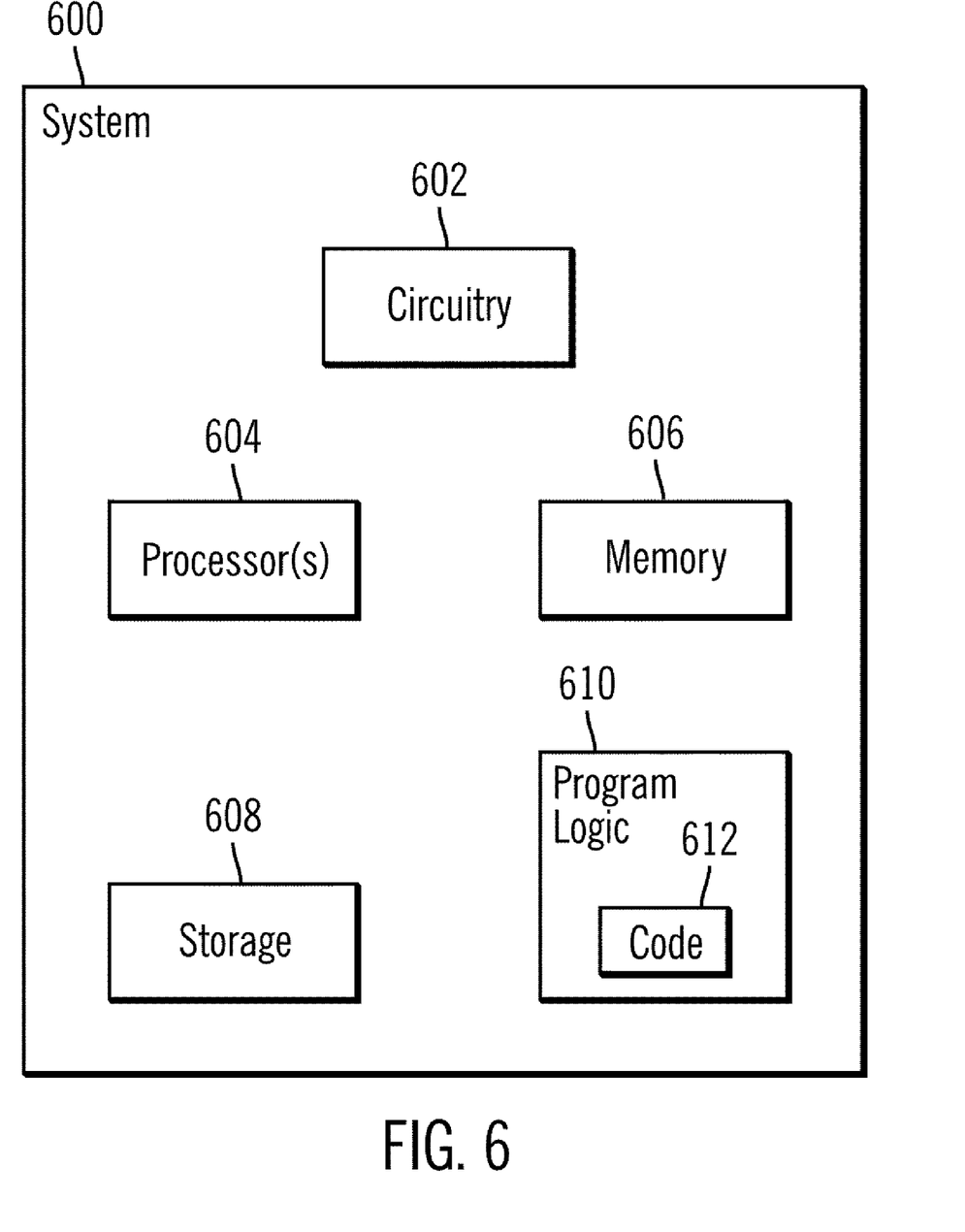
FIG. 6 illustrates a system in which certain embodiments are implemented, in accordance with certain embodiments.

FIG. 6 illustrates a block diagram of a system 600 in which certain embodiments may be implemented. In certain embodiments, the computational platform shown in FIG. 1 such as the server 102 may be implemented in accordance with the system 600. The system 600 may include a circuitry 602 that may in certain embodiments include a processor 604. The system 600 may also include a memory 606 (e.g., a volatile memory device), and storage 608. Certain elements of the system 600 may or may not be found in the computational platform 102. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602.

Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 3, 4, and 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

receiving, via polling a first user defined schedule, by a unified scheduler, wherein the first user defined schedule indicates a first set of requirements to be satisfied for collecting first data on a selected resource of a plurality of resources, wherein the first set of requirements corresponds to a request to collect the data on the selected resource a first plurality of times during a time interval;

receiving, via polling a second user defined schedule, by the unified scheduler, wherein the second user defined schedule indicates a second set of requirements to be satisfied for collecting second data on the selected resource, wherein the second set of requirements corresponds to a request to collect the data on the selected resource a second plurality of times during the time interval, wherein the first plurality of times is greater in number in comparison to the second plurality of times, and wherein the selected resource is selected from a group consisting of printers, scanners, fax machines, disk drives, storage devices, peripheral devices, computing devices and routers;

generating, by the unified scheduler, a master schedule for data collection on the selected resource, based on processing the first and the second user defined schedules, wherein the master schedule corresponds to a request to collect the data on the selected resource the first plurality of times during the time interval, wherein the master schedule is generated to determine when to actually run data collection on the selected resource, wherein for each selected resource of the plurality of resources a different master schedule is generated, wherein the unified scheduler periodically rebuilds one or more of the different master schedules in response to a deletion of a schedule property corresponding to one resource of the plurality of resources, wherein the unified scheduler removes duplicative operations from the first and the second user defined schedules, wherein the unified scheduler creates collections based on a predetermined criteria that does not group identical requirements in the same collection, and wherein the unified scheduler removes conflicts from the first and second user defined schedules; and executing, by the unified scheduler, operations on the selected resource in accordance with the generated master schedule to collect the data on the selected resource the first plurality of times during the time interval, wherein the operations executed by the unified scheduler on the selected resource in accordance with the master schedule are first operations, and wherein the executing of the first operations in accordance with the generated master schedule consume less processing time in comparison to execution of second operations that collect the data on the selected resource based directly on the first and the second user defined schedules, wherein the first user defined schedule and the second user defined schedule are included in a plurality of user defined schedules, wherein the master schedule is a first master schedule, and wherein the unified scheduler groups collections of similar but not identical requests in the plurality of user defined schedules, and combines a collection of the similar requests into a single entity in a second generated master schedule.

2. The method of claim 1, wherein the selected resource is included in a plurality of resources that are included in a plurality of groups, and wherein the plurality of user defined schedules indicate collection of data on the plurality of groups, the method further comprising:

determining, by the unified scheduler, whether the plurality of user defined schedules indicating the collection of data on the plurality of groups cause conflicts in collecting the data on the selected resource, wherein the conflicts prevent the plurality of user defined schedules from being able to run or cause collection of incorrect data; and eliminating, by the unified scheduler, the conflicts in the generated master schedule.

3. The method of claim 1, further comprising:

receiving, by the unified scheduler, an indication that a user defined schedule has been modified; and rebuilding, by the unified scheduler, the schedule based on the modified user defined schedule and other unmodified user defined schedules.

4. The method of claim 1, wherein the first set of requirements of the first user defined schedule indicates a first frequency for collecting the first data, wherein the second set of requirements of the second user defined schedule indicates a second frequency for collecting the second data, wherein the first frequency indicates a first number of times data collection is to be performed per day for collecting the first data, wherein the second frequency indicates a second number of times data collection is to be performed per day for collecting the second data, and wherein:

the selected resource is a first resource;

the master schedule is a first master schedule for the first resource; and a second master schedule is generated for a second resource from one or more additional user defined schedules.

5. A method for deploying computing infrastructure, comprising integrating computer readable code stored in a storage medium into a computing system, wherein the code in combination with the computing system is capable of performing:

receiving, via polling a first user defined schedule, by a unified scheduler, wherein the first user defined schedule indicates a first set of requirements to be satisfied for collecting first data on a selected resource of a plurality of resources, wherein the first set of requirements corresponds to a request to collect the data on the selected resource a first plurality of times during a time interval;

receiving, via polling a second user defined schedule, by the unified scheduler, wherein the second user defined schedule indicates a second set of requirements to be satisfied for collecting second data on the selected resource, wherein the second set of requirements corresponds to a request to collect the data on the selected resource a second plurality of times during the time interval, wherein the first plurality of times is greater in number in comparison to the second plurality of times, and wherein the selected resource is selected from a group consisting of printers, scanners, fax machines, disk drives, storage devices, peripheral devices, computing devices and routers;

generating, by the unified scheduler, a master schedule for data collection on the selected resource, based on processing the first and the second user defined schedules, wherein the master schedule corresponds to a request to collect the data on the selected resource the first plurality of times during the time interval, wherein the master schedule is generated to determine when to actually run data collection on the selected resource, wherein for each selected resource of the plurality of resources a different master schedule is generated, wherein the unified scheduler periodically rebuilds one or more of the different master schedules in response to a deletion of a schedule property corresponding to one resource of the plurality of resources, wherein the unified scheduler removes duplicative operations from the first and the second user defined schedules, wherein the unified scheduler creates collections based on a predetermined criteria that does not group identical requirements in the same collection, and wherein the unified scheduler removes conflicts from the first and second user defined schedules; and executing, by the unified scheduler, operations on the selected resource in accordance with the generated master schedule to collect the data on the selected resource the first plurality of times during the time interval, wherein the operations executed by the unified scheduler on the selected resource in accordance with the master schedule are first operations, and wherein the executing of the first operations in accordance with the generated master schedule consume less processing time in comparison to execution of second operations that collect the data on the selected resource based directly on the first and the second user defined schedules, wherein the first user defined schedule and the second user defined schedule are included in a plurality of user defined schedules, wherein the master schedule is a first master schedule, and wherein the unified scheduler groups collections of similar but not identical requests in the plurality of user defined schedules, and combines a collection of the similar requests into a single entity in a second generated master schedule.

6. The method for deploying computing infrastructure of claim 5, wherein the selected resource is included in a plurality of resources that are included in a plurality of groups, and wherein the plurality of user defined schedules indicate collection of data on the plurality of groups, wherein the code in combination with the computing system is further capable of performing:

determining, by the unified scheduler, whether the plurality of user defined schedules indicating the collection of data on the plurality of groups cause conflicts in collecting the data on the selected resource, wherein the conflicts prevent the plurality of user defined schedules from being able to run or cause collection of incorrect data; and eliminating, by the unified scheduler, the conflicts in the generated master schedule.

7. The method for deploying computing infrastructure of claim 5, wherein the code in combination with the computing system is capable of performing:

receiving, by the unified scheduler, an indication that a user defined schedule has been modified; and rebuilding, by the unified scheduler, the schedule based on the modified user defined schedule and other unmodified user defined schedules.

8. The method for deploying computing infrastructure of claim 5, wherein the first set of requirements of the first user defined schedule indicates a first frequency for collecting the first data, wherein the second set of requirements of the second user defined schedule indicates a second frequency for collecting the second data, wherein the first frequency indicates a first number of times data collection is to be performed per day for collecting the first data, wherein the second frequency indicates a second number of times data collection is to be performed per day for collecting the second data, and wherein:

the selected resource is a first resource;

the master schedule is a first master schedule for the first resource; and a second master schedule is generated for a second resource from one or more additional user defined schedules.

9. The method for deploying computing infrastructure of claim 8, wherein the first resource is a printer, and wherein subsequent to generation of the first and the second master schedules, the unified scheduler builds a list of schedules to run from the first and the second master schedules rather than from the first and the second user defined schedules.

10. The method of claim 4, wherein the first resource is a printer, and wherein subsequent to generation of the first and the second master schedules, the unified scheduler builds a list of schedules to run from the first and the second master schedules rather than from the first and the second user defined schedules.

11. A system, comprising:

a memory; and a processor coupled to the memory, wherein the processor performs operations, the operations comprising:

receiving, via polling a first user defined schedule, by a unified scheduler, wherein the first user defined schedule indicates a first set of requirements to be satisfied for collecting first data on a selected resource of a plurality of resources, wherein the first set of requirements corresponds to a request to collect the data on the selected resource a first plurality of times during a time interval;

receiving, via polling a second user defined schedule, by the unified scheduler, wherein the second user defined schedule indicates a second set of requirements to be satisfied for collecting second data on the selected resource, wherein the second set of requirements corresponds to a request to collect the data on the selected resource a second plurality of times during the time interval, wherein the first plurality of times is greater in number in comparison to the second plurality of times, and wherein the selected resource is selected from a group consisting of printers, scanners, fax machines, disk drives, storage devices, peripheral devices, computing devices and routers;

generating, by the unified scheduler, a master schedule for data collection on the selected resource, based on processing the first and the second user defined schedules, wherein the master schedule corresponds to a request to collect the data on the selected resource the first plurality of times during the time interval, wherein the master schedule is generated to determine when to actually run data collection on the selected resource, wherein for each selected resource of the plurality of resources a different master schedule is generated, wherein the unified scheduler periodically rebuilds one or more of the different master schedules in response to a deletion of a schedule property corresponding to one resource of the plurality of resources, wherein the unified scheduler removes duplicative operations from the first and the second user defined schedules, wherein the unified scheduler creates collections based on a predetermined criteria that does not group identical requirements in the same collection, and wherein the unified scheduler removes conflicts from the first and second user defined schedules; and executing, by the unified scheduler, operations on the selected resource in accordance with the generated master schedule to collect the data on the selected resource the first plurality of times during the time interval, wherein the operations executed by the unified scheduler on the selected resource in accordance with the master schedule are first operations, and wherein the executing of the first operations in accordance with the generated master schedule consume less processing time in comparison to execution of second operations that collect the data on the selected resource based directly on the first and the second user defined schedules, wherein the first user defined schedule and the second user defined schedule are included in a plurality of user defined schedules, wherein the master schedule is a first master schedule, and wherein the unified scheduler groups collections of similar but not identical requests in the plurality of user defined schedules, and combines a collection of the similar requests into a single entity in a second generated master schedule.

12. The system of claim 11, wherein the selected resource is included in a plurality of resources that are included in a plurality of groups, and wherein the plurality of user defined schedules indicate collection of data on the plurality of groups, the operations further comprising:

determining, by the unified scheduler, whether the plurality of user defined schedules indicating the collection of data on the plurality of groups cause conflicts in collecting the data on the selected resource, wherein the conflicts prevent the plurality of user defined schedules from being able to run or cause collection of incorrect data; and eliminating, by the unified scheduler, the conflicts in the generated master schedule.

13. The system of claim 11, the operations further comprising:

receiving, by the unified scheduler, an indication that a user defined schedule has been modified; and rebuilding, by the unified scheduler, the schedule based on the modified user defined schedule and other unmodified user defined schedules.

14. The system of claim 11, wherein the first set of requirements of the first user defined schedule indicates a first frequency for collecting the first data, wherein the second set of requirements of the second user defined schedule indicates a second frequency for collecting the second data, wherein the first frequency indicates a first number of times data collection is to be performed per day for collecting the first data, wherein the second frequency indicates a second number of times data collection is to be performed per day for collecting the second data, and wherein:

the selected resource is a first resource;

the master schedule is a first master schedule for the first resource; and a second master schedule is generated for a second resource from one or more additional user defined schedules.

15. The system of claim 14, wherein the first resource is a printer, and wherein subsequent to generation of the first and the second master schedules, the unified scheduler builds a list of schedules to run from the first and the second master schedules rather than from the first and the second user defined schedules.

16. A computer readable storage medium comprising hardware, wherein code stored in the computer readable storage medium in response to being executed by a processor causes operations, the operations comprising:

receiving, via polling a first user defined schedule, by a unified scheduler, wherein the first user defined schedule indicates a first set of requirements to be satisfied for collecting first data on a selected resource of a plurality of resources, wherein the first set of requirements corresponds to a request to collect the data on the selected resource a first plurality of times during a time interval;

receiving, via polling a second user defined schedule, by the unified scheduler, wherein the second user defined schedule indicates a second set of requirements to be satisfied for collecting second data on the selected resource, wherein the second set of requirements corresponds to a request to collect the data on the selected resource a second plurality of times during the time interval, wherein the first plurality of times is greater in number in comparison to the second plurality of times, and wherein the selected resource is selected from a group consisting of printers, scanners, fax machines, disk drives, storage devices, peripheral devices, computing devices and routers;

generating, by the unified scheduler, a master schedule for data collection on the selected resource, based on processing the first and the second user defined schedules, wherein the master schedule corresponds to a request to collect the data on the selected resource the first plurality of times during the time interval, wherein the master schedule is generated to determine when to actually run data collection on the selected resource, wherein for each selected resource of the plurality of resources a different master schedule is generated, wherein the unified scheduler periodically rebuilds one or more of the different master schedules in response to a deletion of a schedule property corresponding to one resource of the plurality of resources, wherein the unified scheduler removes duplicative operations from the first and the second user defined schedules, wherein the unified scheduler creates collections based on a predetermined criteria that does not group identical requirements in the same collection, and wherein the unified scheduler removes conflicts from the first and second user defined schedules; and executing, by the unified scheduler, operations on the selected resource in accordance with the generated master schedule to collect the data on the selected resource the first plurality of times during the time interval, wherein the operations executed by the unified scheduler on the selected resource in accordance with the master schedule are first operations, and wherein the executing of the first operations in accordance with the generated master schedule consume less processing time in comparison to execution of second operations that collect the data on the selected resource based directly on the first and the second user defined schedules, wherein the first user defined schedule and the second user defined schedule are included in a plurality of user defined schedules, wherein the master schedule is a first master schedule, and wherein the unified scheduler groups collections of similar but not identical requests in the plurality of user defined schedules, and combines a collection of the similar requests into a single entity in a second generated master schedule.

17. The computer readable storage medium of claim 16, wherein the selected resource is included in a plurality of resources that are included in a plurality of groups, and wherein the plurality of user defined schedules indicate collection of data on the plurality of groups, the operations further comprising:

determining, by the unified scheduler, whether the plurality of user defined schedules indicating the collection of data on the plurality of groups cause conflicts in collecting the data on the selected resource, wherein the conflicts prevent the plurality of user defined schedules from being able to run or cause collection of incorrect data; and eliminating, by the unified scheduler, the conflicts in the generated master schedule.

18. The computer readable storage medium of claim 16, the operations further comprising:

receiving, by the unified scheduler, an indication that a user defined schedule has been modified; and rebuilding, by the unified scheduler, the schedule based on the modified user defined schedule and other unmodified user defined schedules.

19. The computer readable storage medium of claim 16, wherein the first set of requirements of the first user defined schedule indicates a first frequency for collecting the first data, wherein the second set of requirements of the second user defined schedule indicates a second frequency for collecting the second data, wherein the first frequency indicates a first number of times data collection is to be performed per day for collecting the first data, wherein the second frequency indicates a second number of times data collection is to be performed per day for collecting the second data, and wherein:

the selected resource is a first resource;

the master schedule is a first master schedule for the first resource; and a second master schedule is generated for a second resource from one or more additional user defined schedules.

20. The computer readable storage medium of claim 19, wherein the first resource is a printer, the operations further comprising:

subsequent to generation of the first and the second master schedules, the unified scheduler builds a list of schedules to run from the first and the second master schedules rather than from the first and the second user defined schedules.

\* \* \* \* \*